(12) United States Patent
Kim et al.

(10) Patent No.: US 12,008,971 B2
(45) Date of Patent: Jun. 11, 2024

(54) DISPLAY DEVICE AND CONTROL METHOD THEREFOR

(71) Applicant: SAMSUNG ELECTRONICS CO., LTD., Suwon-si (KR)

(72) Inventors: Doyoung Kim, Suwon-si (KR); Gwanghyun Kim, Suwon-si (KR); Wonpil Kim, Suwon-si (KR); Heehyo Yang, Suwon-si (KR); Younggon Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/116,551

(22) Filed: Mar. 2, 2023

(65) Prior Publication Data

US 2023/0206868 A1 Jun. 29, 2023

Related U.S. Application Data

(63) Continuation of application No. PCT/KR2021/010304, filed on Aug. 4, 2021.

(30) Foreign Application Priority Data

Sep. 23, 2020 (KR) .................. 10-2020-0122873

(51) Int. Cl.
   *G09G 3/36* (2006.01)
   *G09G 3/34* (2006.01)
   *H02J 7/00* (2006.01)

(52) U.S. Cl.
   CPC ............. *G09G 3/36* (2013.01); *G09G 3/3406* (2013.01); *G09G 2320/0626* (2013.01);
   (Continued)

(58) Field of Classification Search
   CPC .................. G09G 3/36; G09G 3/3406; G09G 2320/0626; G09G 2330/023;
   (Continued)

(56) References Cited

U.S. PATENT DOCUMENTS 8,669,735 B2   3/2014   Kim et al.
9,047,808 B2   6/2015   Cho et al.
(Continued)

FOREIGN PATENT DOCUMENTS

JP   2001-242965   9/2001
JP   5085697      11/2012
(Continued)

OTHER PUBLICATIONS

International Search Report dated Nov. 12, 2021 issued in PCT/KR2021/010304 (2 pages).
(Continued)

*Primary Examiner* — Michael J Jansen, II
(74) *Attorney, Agent, or Firm* — Nixon & Vanderhye, P.C.

(57) ABSTRACT

A display device is disclosed. The display device may comprise: a power supply configured to generate power; an external input port, which can be connected to at least one external device; a display; and a processor configured to: acquire brightness information about the display, identify first power information required by the display based on the acquired brightness information, and adjust, based on the identified first power information and second power information provided from the power supply, power supplied to the external input port.

12 Claims, 11 Drawing Sheets

(52) U.S. Cl.
CPC ... *G09G 2330/023* (2013.01); *G09G 2354/00* (2013.01); *H02J 7/0042* (2013.01)

(58) Field of Classification Search
CPC ....... G09G 2354/00; G09G 2320/0653; G09G 2330/00; G09G 2360/16; G09G 3/20
See application file for complete search history.

(56) References Cited

U.S. PATENT DOCUMENTS

| | | | |
|---|---|---|---|
| 9,368,988 | B2 | 6/2016 | Cho et al. |
| 9,495,537 | B2 | 11/2016 | Gupta et al. |
| 9,524,681 | B2 * | 12/2016 | Vasquez ............... G09G 3/3406 |
| 9,958,920 | B2 | 5/2018 | Uchiyama et al. |
| 10,211,661 | B2 | 2/2019 | Kim et al. |
| 10,359,824 | B2 * | 7/2019 | Seo ......................... G06F 1/263 |
| 10,855,099 | B2 | 12/2020 | Kim et al. |
| 11,460,900 | B2 * | 10/2022 | Nagano ..................... G09G 3/20 |
| 2006/0035527 | A1 | 2/2006 | Numano |
| 2010/0097030 | A1 | 4/2010 | Kim et al. |
| 2012/0139474 | A1 | 6/2012 | Cho et al. |
| 2014/0292631 | A1 * | 10/2014 | Vasquez ............... G09G 3/2096 345/102 |
| 2015/0236528 | A1 | 8/2015 | Kim et al. |
| 2015/0249356 | A1 | 9/2015 | Cho et al. |
| 2016/0043595 | A1 | 2/2016 | Uchiyama et al. |
| 2017/0017283 | A1 * | 1/2017 | Seo ............................ G06F 3/16 |
| 2020/0119581 | A1 | 4/2020 | Kim et al. |
| 2020/0371573 | A1 * | 11/2020 | Nagano ................... G09G 3/36 |
| 2021/0036525 | A1 | 2/2021 | Kim et al. |
| 2021/0083515 | A1 | 3/2021 | Kim et al. |

FOREIGN PATENT DOCUMENTS

| | | |
|---|---|---|
| JP | 2015-174376 | 10/2015 |
| JP | 6362956 | 7/2018 |
| KR | 10-2008-0064626 | 7/2008 |
| KR | 10-2010-0043531 | 4/2010 |
| KR | 10-2015-0097330 | 8/2015 |
| KR | 10-2017-0009279 | 1/2017 |
| KR | 10-1717505 | 3/2017 |
| KR | 10-2019-0111640 | 10/2019 |
| KR | 10-2020-0042426 | 4/2020 |

OTHER PUBLICATIONS

Written Opinion dated Nov. 12, 2021 issued in PCT/KR2021/010304 (2 pages).
USB Power Delivery (USB Developer Days 2019—Taipei, Taiwan Nov. 20, 2019) (104 pages).

* cited by examiner

DISPLAY DEVICE AND CONTROL METHOD THEREFOR

CROSS-REFERENCE TO RELATED APPLICATIONS

This application is a continuation of International Application No. PCT/KR2021/010304 designating the United States, filed on Aug. 4, 2021, in the Korean Intellectual Property Receiving Office and claiming priority to Korean Patent Application No. 10-2020-0122873, filed on Sep. 23, 2020, in the Korean Intellectual Property Office, the disclosures of which are incorporated by reference herein in their entireties.

BACKGROUND

Field

The disclosure relates to a display device which may supply power through an external input port, and a control method therefor.

Description of Related Art

In recent years, the number of external devices which may support fast charging has been increased, and a user demand for fast charging has also been steadily increased.

However, a conventional display device may supply power to an external device through an external input port having a universal serial bus (USB) standard or the like. However, the conventional display device may only supply constant power regardless of power consumption of the device, and thus be unable to supply sufficient power to the external device except by increasing capacity of a power supply unit.

SUMMARY

Embodiments of the disclosure provide a display device which may supply sufficient power to an external device without increasing supply capacity of the power supply unit, and a control method therefor.

According to an example embodiment of the present disclosure, a display device includes: a power supply configured to supply power; an external input port connectable to at least one external device; a display; and a processor configured to: acquire brightness information of the display, identify first power information required from the display based on the acquired brightness information, and adjust the power supplied to the external input port based on the identified first power information and second power information supplied from the power supply.

The processor may be configured to receive third power information required from the external device connected to the external input port, and adjust the power supplied to the external input port based on the received third power information, first power information, and second power information.

The processor may be configured to identify information on the power available for the external input port based on the first power information and the second power information, and adjust the power supplied to the external input port based on the identified power information and the received third power information.

The third power information may be information on voltage and current values required for charging the external device, and the processor may be configured to supply the power to the external input port at the voltage and current values included in the third power information based on the power required from the external device calculated on the basis of the voltage and current values not exceeding the power available.

The processor may be configured to supply the power to the external input port at specified voltage and current values within a range of values not exceeding the power available based on the power required from the external device calculated on the basis of the voltage and current values exceeding the power available.

The processor may be configured to receive the third power information required from the external device using a universal serial bus-power delivery (USB-PD) method or a power data objects (PDO) method.

The processor may be configured to adjust the power supplied to the external input port based on fourth power information and the second power information, required from the display, based on the display device being in a power saving mode, and the fourth power information includes default power information corresponding to the power saving mode.

The processor may be configured to adjust the power supplied to the external input port to threshold power based on the display device being switched from the power saving mode to the normal mode, control the display to display an image corresponding to the normal mode, acquire the brightness information of the display, and re-identify the first power information required from the display based on the acquired brightness information.

The device may further include an input unit comprising circuitry, wherein the processor may acquire the brightness information of the display when a command for adjusting the brightness of the display is input through the input unit.

In addition, the external input port may have a USB type-C standard.

According to an example embodiment of the present disclosure, a method of controlling a display device includes: acquiring brightness information of a display; identifying first power information required from the display based on the acquired brightness information; and adjusting power supplied to an external input port connectable to at least one external device based on the identified first power information and second power information supplied from a power supply.

The adjusting of the power supplied to the external input port may include: receiving third power information required from the external device connected to the external input port; and adjusting the power supplied to the external input port based on the received third power information, first power information, and second power information.

The adjusting of the power supplied to the external input port may include: identifying information on the power available for the external input port based on the first power information and the second power information; and adjusting the power supplied to the external input port based on the identified power information and the received third power information.

The third power information may include information on voltage and current values required for charging the external device, and in the adjusting of the power supplied to the external input port, the power may be supplied to the external input port at the voltage and current values included in the third power information based on the power required from the external device that is calculated on the basis of the voltage and current values not exceeding the power available.

In the adjusting of the power supplied to the external input port, the power may be supplied to the external input port at specified voltage and current values within a range that the values do not exceed the power available based on the power required from the external device calculated on the basis of the voltage and current values exceeding the power available.

According to various example embodiments of the present disclosure, it is possible to shorten the charging time of the external device by supplying more power to the external device when the power consumption of the display device is reduced.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
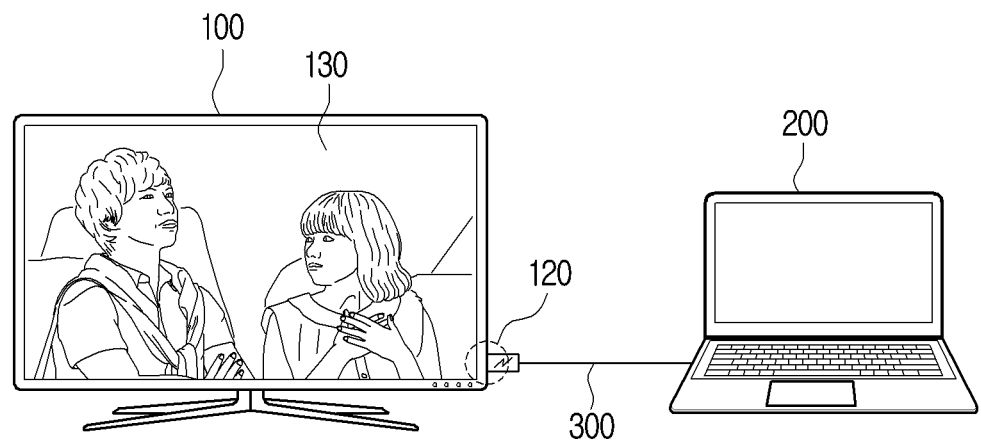
FIG. 1 is a diagram a display device and an external device according to various embodiments.

Hereinafter, the present disclosure is described in greater detail with reference to the accompanying drawings.

General terms that are currently widely used were selected as terms used in embodiments of the present disclosure in consideration of functions in the present disclosure, and may be changed based on the intentions of those skilled in the art or a judicial precedent, the emergence of a new technique, and the like. In addition, terms may be arbitrarily chosen. In this case, the meanings of such terms are mentioned in detail in corresponding description portions of the present disclosure. Therefore, the terms used in the embodiments of the present disclosure should be defined on the basis of the meaning of the terms and the contents throughout the present disclosure rather than simple names of the terms.

In the present disclosure, an expression "have," "may have," "include," "may include," or the like, indicates the existence of a corresponding feature (for example, a numerical value, a function, an operation or a component such as a part), and does not exclude the existence of an additional feature.

An expression, "at least one of A or/and B" may indicate either "A or B," or "both of A and B."

Expressions "first," "second," or the like, used in the present disclosure may indicate various components regardless of a sequence and/or importance of the components. These expressions are used only in order to distinguish one component from the other components, and do not limit the corresponding components.

In case any component (for example, a first component) is mentioned to be "(operatively or communicatively) coupled with/to" or "connected to" another component (for example, a second component), it is to be understood that the any component may be directly coupled to the another component or may be coupled to the another component through still another component (for example, a third component).

A term of a singular number may include its plural number unless explicitly represented otherwise in the context. It is to be understood that a term "include," "formed of," or the like used in this application specifies the presence of features, numerals, steps, operations, components, parts or combinations thereof, which is mentioned in the disclosure, and does not preclude the presence or addition of one or more other features, numerals, steps, operations, components, parts or combinations thereof.

In the embodiments, a "module" or a "~er/~or" may perform at least one function or operation, and be implemented by hardware or software, or be implemented by a combination of hardware and software. In addition, a plurality of "modules" or a plurality of "~ers/~ors" may be integrated in at least one module and implemented by at least one processor (not shown) except for a "module" or a "~er/or" that needs to be implemented by specific hardware.

In the present disclosure, such a term as "user" may refer to a person who uses an electronic device or a device (e.g., artificial intelligence electronic device) which uses an electronic device.

Hereinafter, various example embodiments of the present disclosure are described in greater detail with reference to the accompanying drawings.

FIG. 1 is a diagram illustrating an example display device and an external device according to various embodiments.

A display device 100 according to an embodiment of the present disclosure indicates an electronic device having a display. For example, the display device 100 may be implemented as any of various types of home appliances such as, for example, and without limitation, a refrigerator, a washing machine, and an air conditioner each having a display 130 in addition to a television (TV), a monitor, a laptop personal computer (PC), a mobile phone, a personal digital assistant (PDA), a kiosk, a video wall, or the like.

The display device 100 according to an embodiment of the present disclosure may receive and display various types of contents such as game content, movie content, home shopping content, drama content, and VR content through the display 130.

In addition, the display device 100 according to an embodiment of the present disclosure may include an external input port 120 which may be connected to an external device 200 by wire of cable 300.

The external device 200 according to an embodiment of the present disclosure indicates an electronic device which may be connected to the display device 100 by wire. The external device 200 may be implemented as a laptop PC, is not limited thereto, and may be implemented as any of various devices which may receive power through a wired connection such as a tablet PC, a mobile phone, a video phone, a smartphone, a netbook computer, and a work station, a personal digital assistants (PDA), a portable multimedia player (PMP), a moving picture experts group (MPEG) audio layer-3 (MP3) player, a camera, a virtual reality (VR) implementation device, or wearable device.

The display device 100 according to an embodiment of the present disclosure may be connected to the external device 200 through the external input port 120 positioned on one side of the device to supply the power to the external device 200. The maximum amount of power that the display device 100 may supply to the external device 200 may be fixed regardless of power consumption of the device. In this case, the display device 100 may only transfer limited power to the external device 200 even though the display device 100 has a margin of the supply power such as when operated in a power saving mode or at low brightness.

However, it may be necessary to supply large power through the external input port 120 for fast charging of the external device 200. Hereinafter, the description describes various examples in which high power may be flexibly transferred to the external device 200 based on the power consumption of the display device 100 without increasing capacity of the supply power.

Figure 2A:
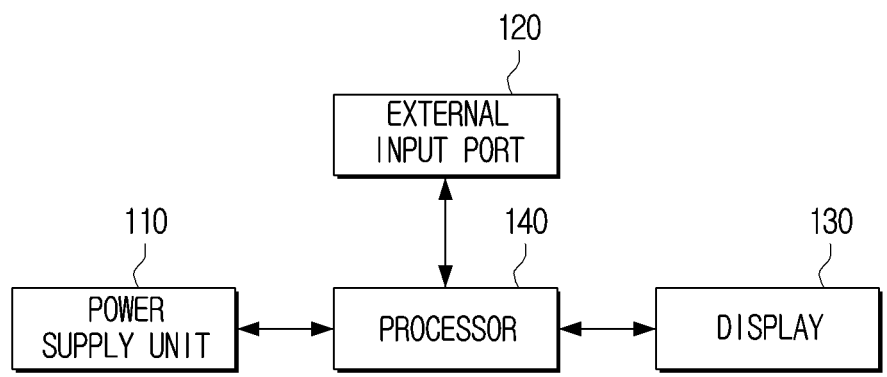
FIGS. 2A and 2B are block diagrams illustrating example configurations of the display device according to various embodiments.

FIG. 2A is a block diagram illustrating an example configuration of the display device according to various embodiments.

A power supply unit (e.g., power supply) 110 may supply the power to the display device 100.

The power supply unit 110 is not limited to a specific device, and in this disclosure, it is described on a premise that the power supply unit is a switching mode power supply (SMPS).

The SMPS indicates a power supply device operated by a switching operation, and is a power supply device which may reduce the size and weight of an energy storage component or the like using a switching frequency of tens to hundreds of kHz.

The SMPS positioned in the display device 100 may have its own power capacity, and a problem may occur in an operation of the display device 100 when receiving power demand exceeding its power capacity.

Therefore, the sum of the power consumed by the display device 100 and the power supplied to the external device 200 through the external input port 120 is required not to exceed the power capacity of the SMPS.

In general, a processor 140 may include various processing circuitry and control the display device 100 while securing constant idle power for the sum of the power consumed by the display device 100 and the power supplied to the external device 200 through the external input port 120 not to reach the power capacity of the SMPS.

The external input port 120 may be a port through which the display device 100 and the external device 200 may be connected by wire.

The external input port 120 may be a port having any one standard of a high definition multimedia interface (HDMI), a mobile high-definition link (MHL), a universal serial bus (USB), a display port (DP), a thunderbolt, a video graphics array (VGA) port, a red-green-blue (RGB) port, a D-sub-miniature (D-SUB) or a digital visual interface (DVI).

The display device 100 according to an embodiment of the present disclosure may perform communication with the external device 200 through the external input port 120.

Furthermore, the display device 100 may supply the power to the external device 100 through the external input port 120.

In this disclosure, it is described on a premise that the external input port 120 is a USB port generally positioned in the display device while achieving all the functions of the above-described external input port 120.

The display device 100 according to an embodiment of the present disclosure may be connected to the external device 200 through a cable 300 (refer to FIG. 1). The other side of the cable 300 having one side connected to the external input port 120 may be connected to the external device 200, and the display device 100 may transmit and receive input/output signals through the cable 300 and simultaneously supply the power.

The display device 100 according to an embodiment of the present disclosure may include the plurality of external input ports 120, and each external input port 120 may be connected to at least one external device 200.

The display 130 may be implemented as any of various types of displays such as, for example, and without limitation, a liquid crystal display (LCD), an organic light emitting diode (OLED) display, a quantum dot light-emitting diode (QLED) display, and a plasma display panel (PDP), or the like. In addition, the display 120 may include a driving circuit, a backlight unit, and the like, which may be implemented in the form such as a thin film transistor (TFT), low temperature poly silicon (LTPS) TFT, or an organic TFT (OTFT). The display 120 may be implemented as a touch screen combined with a touch sensor, a flexible display, a three-dimensional (3D) display, or the like.

In this disclosure, it is described on a premise that the display 130 is implemented as the LCD.

The processor 140 may generally control operations of the display device 100.

For example, the processor 140 may be connected to each component of the display device 100 to thus generally control the operations of the display device 100. For example, the processor 140 may be connected to the power supply unit 110, the external input port 120, and the display 130 to control the operation of the display device 100.

According to an embodiment, the processor 140 may be indicated by any of various names such as, for example, and without limitation, a digital signal processor (DSP), a microprocessor, a central processing unit (CPU), a micro controller unit (MCU), a micro processing unit (MPU), a neural processing unit (NPU), a controller, and an application processor (AP), and the present disclosure uses its name as the processor 130. The processor 140 may be implemented as a system-on-chip (SoC) or a large scale integration (LSI), or may be implemented in the form of a field programmable gate array (FPGA). In addition, the processor 140 may include a volatile memory such as a static random access memory (SRAM).

The processor 140 according to an embodiment may acquire brightness information of the display 130, and identify power information (hereinafter, first power information) required from the display on the basis of the acquired brightness information.

In various implementation examples, the display 130 may include only a display panel when the display element is a self-light emitting element, or may include the display panel and the backlight unit when the display element is a non-self-luminous element.

The brightness information may include at least one of the brightness value (zero to 100), saturation value, and gamma value of an image displayed on the display 130. However, a brightness value of the backlight unit (not shown) may be additionally included in the brightness information based on the implementation example of the display 130.

The disclosure describes a case where the display 130 includes the display panel and the backlight unit.

The first power information according to an embodiment of the present disclosure may include information on the power consumed by the display 130. For example, the first power information may include information on the power consumed by the display panel, for example, a liquid crystal panel and the backlight unit.

The processor 140 may then adjust the power supplied to the external input port 120 on the basis of the identified first power information and power information (hereinafter referred to as second power information) supplied from the power supply unit 110.

The second power information may include information on the SMPS power capacity, duty ratio, frequency, or the like of the power supply unit 110.

The SMPS power capacity according to an embodiment of the present disclosure may be 100 W and the power consumed by the display 130 may be 30 W. In this case, the processor 140 may adjust the power supplied to the external input port 120 on the basis of the SMPS power capacity 100 W included in the second power information and the power consumption 30 W of the display 130 included in the first power information. In this case, the processor 140 may control the display device 100 so that the power supplied to the external input port 120 does not exceed 70 W.

The processor 140 according to an embodiment of the present disclosure may receive power information (hereinafter referred to as third power information) required from the external device 200 connected to the external input port 120.

The third power information may include information on maximum power, a maximum voltage value, and a maximum current value, required from the external device 200 in a charging process.

For example, the processor 140 may adjust the power supplied to the external input port 120 on the basis of the received third power information, first power information, and second power information.

The processor 140 according to an embodiment of the present disclosure may identify information on the power available for the external input port 120 on the basis of the first power information and the second power information. For example, the SMPS power capacity may be 100 W and the power consumption of the display 130 may be 30 W. In this case, the power available for the external input port 120 may be set to 70 W if the idle power is not considered.

However, the display device 100 may not always supply the power available for the external device 200 through the external input port 120. For example, the maximum power that the external device 200 may receive may not exceed 70 W even when the SMPS power capacity is 100 W and the power consumption of the display 130 is 30 W, and the display device 100 may thus supply the power to the external device 200 up to 70 W. In this case, the processor 140 may set the maximum power that the external device 200 may receive as the power supplied through the external input port 120.

On the other hand, the maximum power that the external device 200 may receive may exceed the power available by the display device 100. In this case, the processor 140 may supply the power to the external input port 120 at predetermined (e.g., specified) voltage and current values within a range that the values do not exceed the power available by the display device 100. A detailed description of this configuration is described in greater detail below with reference to FIG. 3.

The processor 140 may receive the third power information required from the external device using a USB power delivery (USB-PD) method or a power data objects (PDO) method.

The USB-PD conforms to a power supply standard for charging the electronic device using a USB terminal, and may supply the power up to 100 W through a USB cable.

Prior to the power supply through the USB-PD, the display device 100 and the external device 200, according to an embodiment of the present disclosure, may determine how to set the voltage and the current values during charging of the electronic devices connected with each other through the USB terminal.

The power data objects (PDO) method may be used in this process. The PDO indicates a method of determining the voltage and current values for the power supply by exchanging specification information (hereinafter referred to as power supply specification information) on the voltage and current values that are used for the power supply of the electronic devices connected with each other through the USB cable.

The processor 140 according to an embodiment of the present disclosure may adjust the power supplied to the external input port 120 on the basis of fourth power information and the second power information, required from the display 130, when the display device 100 is in the power saving mode.

The fourth power information may include default power information corresponding to the power saving mode. When the display device 100 is in the power saving mode, the display device 100 may not consume the power except for standby power for receiving a signal for switching the device to a normal mode. Accordingly, the fourth power information may include power information corresponding to the standby power, which may be a predetermined value.

The processor 140 may adjust the power supplied to the external input port 120 to threshold power when the display device 100 is switched from the power saving mode to the normal mode. The reason is that as the display device 100 is operated in the normal mode and the power consumed by the device is increased, a problem may occur in the power supply unit 110 or the entire device when a power value previously supplied to the external input port 120 is maintained.

The processor 140 may then control the display 130 to display an image corresponding to the normal mode, acquire the brightness information of the display 130, and re-identify the first power information required from the display 130 on the basis of the acquired brightness information.

Figure 2B:
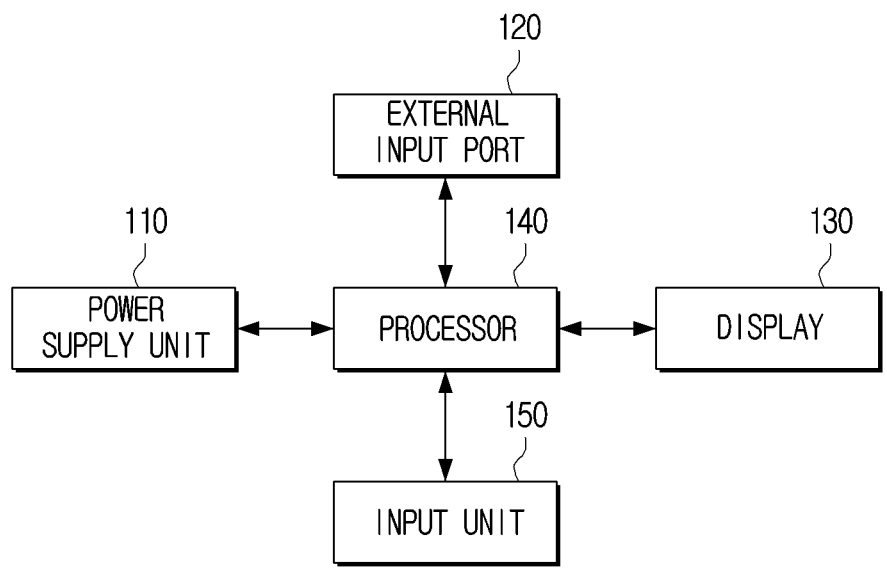

As shown in FIG. 2B according to an embodiment of the present disclosure, the display device 100 may further include an input unit (e.g., including input circuitry) 150.

The input unit 150 may include various input circuitry and be implemented as a device such as a button, a touch pad, a jog dial, a mouse, or a keyboard, or may be implemented as a touch screen, a remote control transceiver, or the like, which may perform the above-described display function and an operation input function together. The remote control transceiver may receive or transmit a remote control signal from an external remote control device through at least one of infrared communication, Bluetooth communication, and Wi-Fi communication.

The processor 140 according to an embodiment of the present disclosure may acquire the brightness information of the display 130 when a user command for adjusting the brightness of the display 130 is input through the input unit 150.

The external input port 120 may be positioned in the display device 100 according to an embodiment of the present disclosure may have a USB type-C standard.

USB type-C may be a 24-pin USB terminal system that allows transfer of data and power.

The USB type-C may be used for the above-mentioned USB-PD standard, easy for the fast charging, and a terminal system with high usability as having no distinction between top and bottom.

Figure 3:
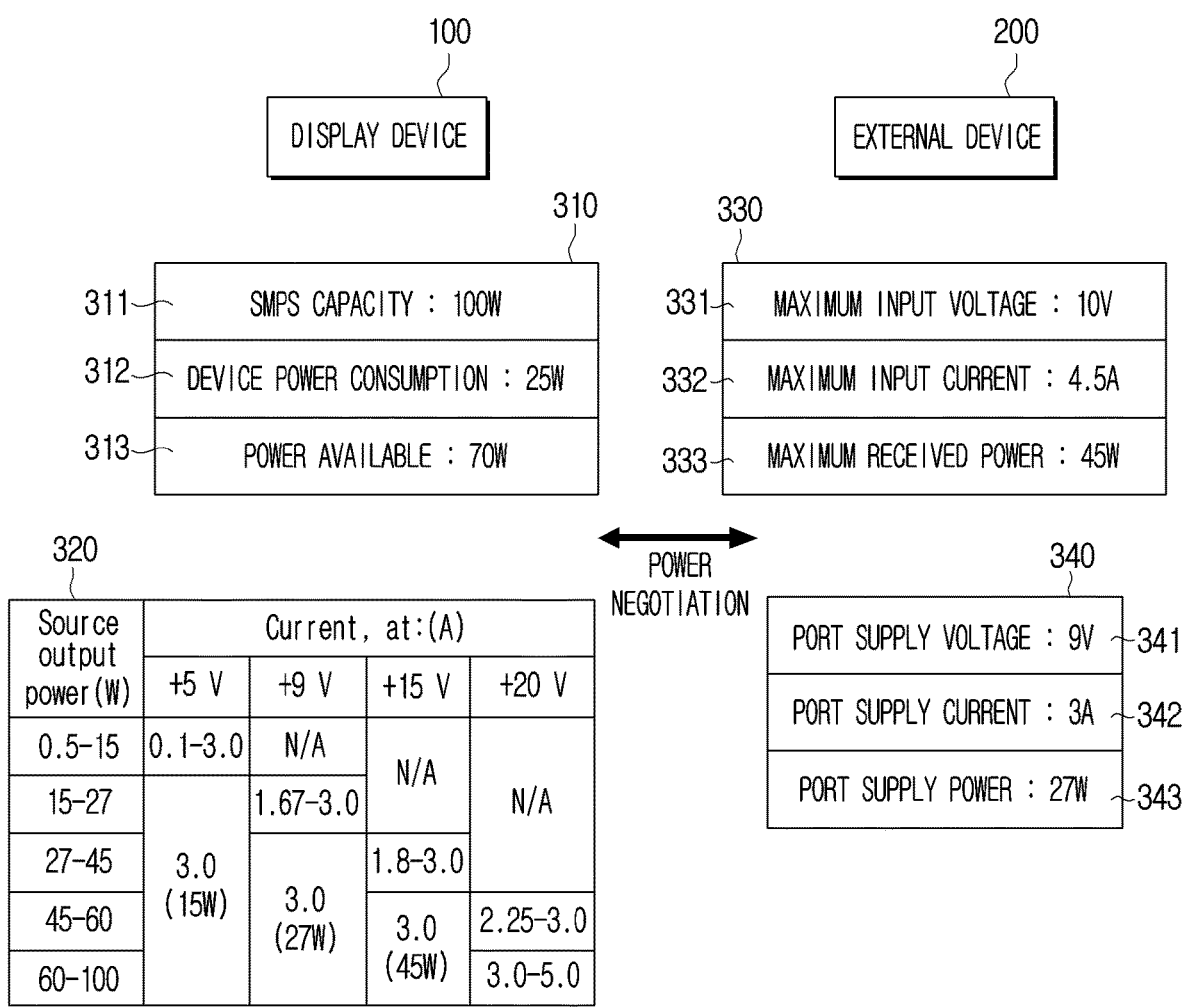
FIG. 3 is a diagram illustrating supply power determination through communication between the display device and the external device according to various embodiments.

FIG. 3 is a diagram illustrating example supply power determination through communication between the display device and the external device according to various embodiments.

An upper left table 310 of FIG. 3 shows the supply and power consumption of the display device 100 according to an embodiment of the present disclosure. In the display device 100 according to an example, SMPS capacity 311 of the power supply unit 110 may be 100 W and device power consumption 312 may be 25 W, and 70 W 313 except for idle power 5 W may be supplied to the external device 200 through the external input port 120.

A lower left table 320 of FIG. 3 relates to the power supply specification information of the display device according to an embodiment of the present disclosure.

The power supply specification information according to an example may be specification information obtained using the power data objects (PDO) method. According to the PDO method, the display device 100 may supply the power to the external device 200 only at the predetermined voltage.

Referring to the table 320, the display device 100 may supply the external device 200 with a current of 0.1 A to 3.0 A at a voltage of 5V, a current of 1.67 A to 3.0 A at a voltage of 9V, a current of 1.8 A to 3.0 A at a voltage of 15V, and a current of 2.25 A to 5A at a voltage of 20V.

An upper right table 330 of FIG. 3 relates to the maximum input voltage, maximum input current, and maximum received power of the external device 200 according to an embodiment of the present disclosure.

The external device 200 according to an embodiment may have a maximum input voltage 331 of 10V, a maximum input current 332 of 4.5 A, and a maximum received power 333 of 45 W.

The display device 100 and the external device 200 according to an embodiment of the present disclosure may exchange information on each device shown in 331, 332, and 333 of the above-described table through wired communication prior to the power supply. The maximum received power 333 of the external device 200 may not exceed the available power of the display device 100, and the display device 100 may thus supply 45 W to the external device 200.

However, the display device 100 and the external device 200 according to an embodiment may be powered by the PDO method. In this case, referring to table 340, the power may be supplied only at the predetermined voltage, 9V that does not exceed the maximum input voltage 331 of the external device 200 may be determined as the voltage 341 supplied from the external input port 120.

Referring to the table 320 on the power supply specification information, the display device 100 may supply the current up to 3.0 A when an output voltage is 9V, which does not exceed the maximum input current 332 of the external device 200, and the current 342 supplied from the external input port 120 may be determined to be 3.0 A.

Finally, 27 W, which is the product of the port supply voltage 341 and the port supply current 342, may be determined as the port supply power 343. In FIG. 3, the above-described port supply power decision process is expressed in terms of power negotiation.

Figure 4:
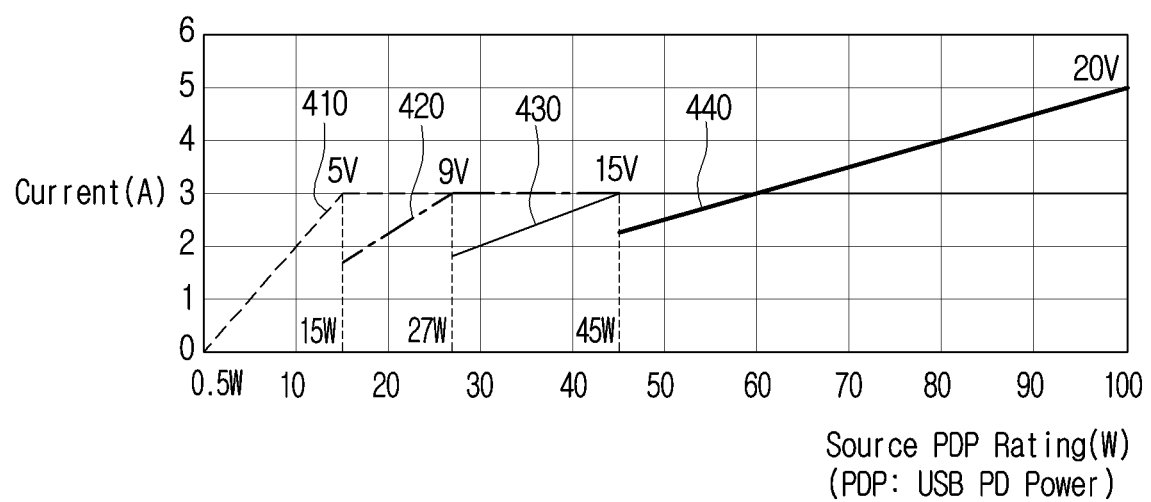
FIG. 4 is a graph of voltage and current values corresponding to the supply power, according to various embodiments.

FIG. 4 is a graph of the voltage and current values corresponding to the supply power, according to various embodiments.

FIG. 4 shows the voltage and current values on a premise that the power is supplied by the above-described PDO method, and is a graph showing the table 320 related to the power supply specification information of FIG. 3.

In a far left graph 410 of FIG. 4, it may be seen that the power supply of up to 15 W is possible as the current has a value of 0.1 A to 3.0 A when the power is supplied at the output voltage of 5V.

In a second graph 420 from the left, it may be seen that the power supply of up to 27 W is possible as the current has a value of 1.67 A to 3 A when the power is supplied at the output voltage of 9V.

In a third graph 430 from the left, it may be seen that the power supply of up to 45 W is possible as the current has a value of 1.8 A to 3 A when the power is supplied at the output voltage of 15V.

In a far right graph 440, it may be seen that the power supply of up to 100 W is possible as the current has a value of 2.25 A to 5 A when the power is supplied at the output voltage of 20V.

Figure 5:
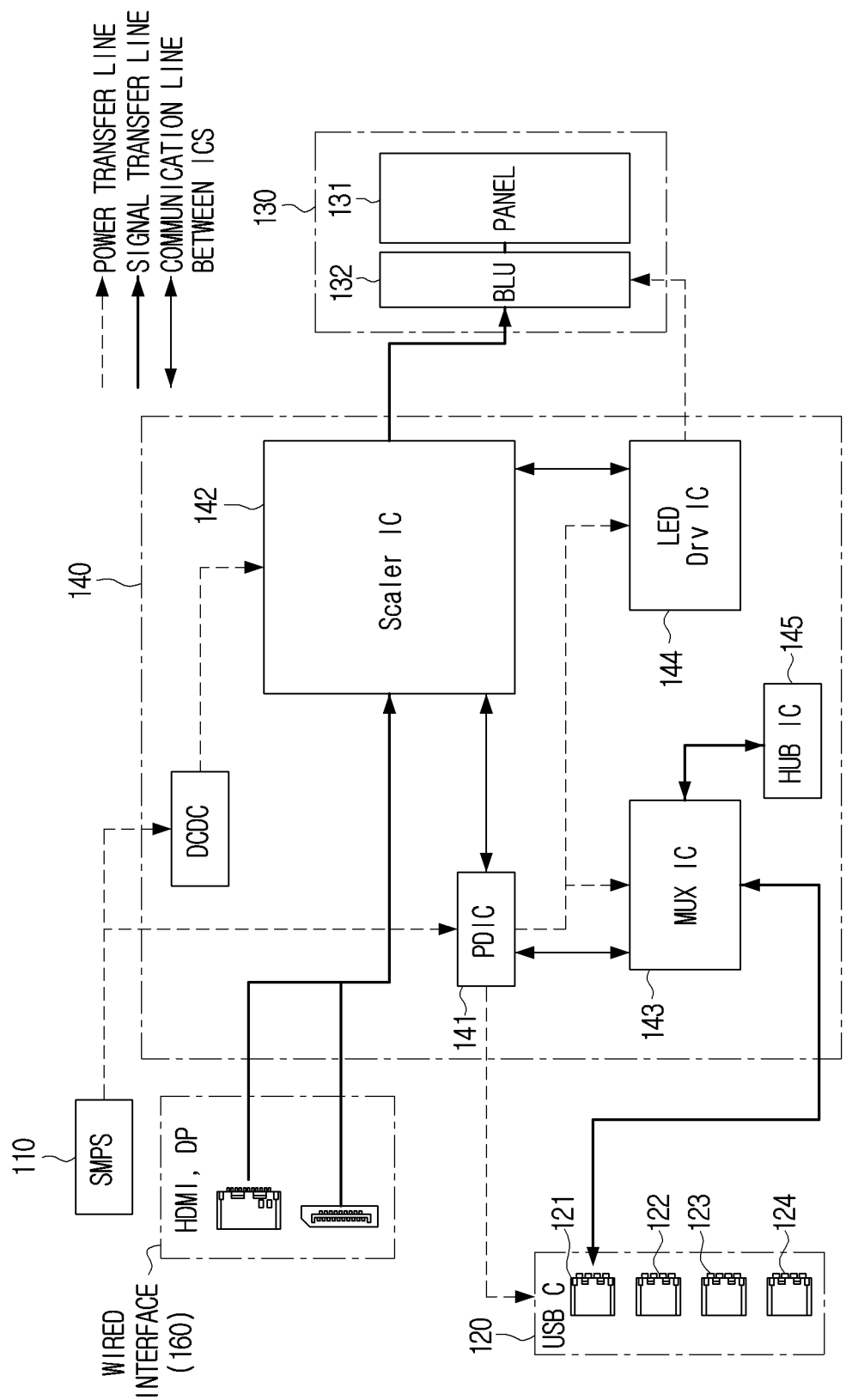
FIG. 5 is a diagram illustrating example components of the display device and transfer of other power signals between the components according to various embodiments.

FIG. 5 is a diagram illustrating example components of the display device and transfer of power other signals between the components according to various embodiments.

The external input port 120 according to an embodiment of the present disclosure may include a plurality of USB ports 121, 122, 123, and 124. The cable 300 connected to the external device 200 may be coupled to each USB port. Here, one port 121 of the plurality of USB ports may have the USB type-C standard.

According to an embodiment, the description is provided with reference to FIG. 5 on a premise that the external device 200 is connected to one port 121, and an external USB (not shown) are connected to the other port 122, 123, or 124.

The display 130 according to an embodiment of the present disclosure may be an LCD panel and include a liquid crystal panel 131 and a back light unit (BLU) 132.

The processor 140 according to an embodiment of the present disclosure may include a power delivery integrated circuit (PDIC) 141, a Scaler IC 142, a HUB IC 143, and an LED driver IC 144.

The power delivery IC (PDIC) 141 may be an IC chip that adjusts the power supplied by the SMPS of the power supply unit 110 to the external input port 120 and the display 130, respectively. This IC may also be referred to as a power management IC (PMIC), and manage the display device 100 according to an embodiment of the present disclosure to accurately and efficiently supply power required to the components.

The PDIC 141 according to an embodiment of the present disclosure may adjust the power supplied to one USB port 121 having the USB type-C standard.

The Scaler IC 142 may function to expand and contract image data input to the display device 100 and display the same on the display 130. The Scaler IC 142 may receive the image data through a wired interface 160, and for example, the wired interface 160 may be a high definition multimedia interface (HDMI).

A MUX IC 143 may select one of a plurality of input signals input from the plurality of USB ports 121, 122, 123, and 124, and transfer the selected input to the Scaler IC 142 and the HUB IC 145.

The LED Driver IC 144 is a key component essential for driving the display device 100, and may be a semiconductor IC that provides driving signals and data to the display panel 131 as electrical signals (or multi high voltage level signals) and supplies the power to the light emitting diode (LED) positioned in the back light unit 132 so that a text or an image is displayed on the display 130.

The HUB IC 145 may transfer the input data signal of the external USB (not shown) to the external device 200 connected to the display device 100 through one port 121 through upstream. For example, the data signals may be sequentially transferred to the external USB (not shown) connected to the other port 122, 123, or 124, the HUB IC 145, the MUX IC 143, and the external device 200 connected to one port 121.

Figure 6:
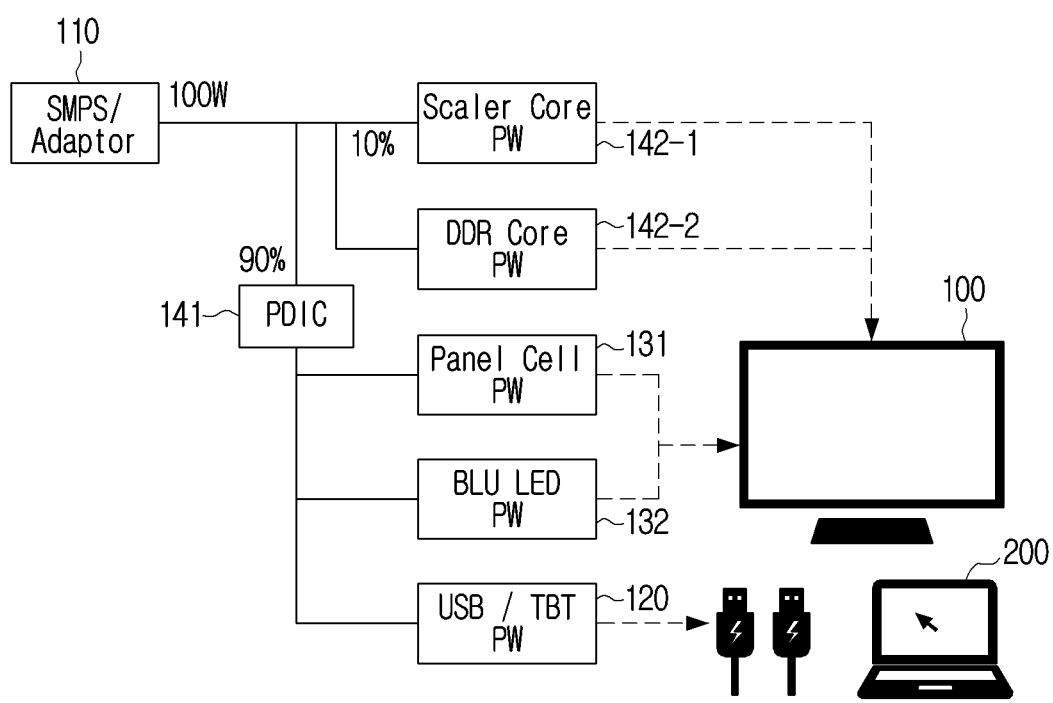
FIG. 6 is a power distribution diagram of the display device according to various embodiments.

FIG. 6 is a power distribution diagram of the display device according to various embodiments.

The power consumed by the Scaler IC 142 according to an embodiment of the present disclosure may include a Scaler Core PW 142-1 and a DDR Core PW 142-2.

The Scaler Core PW 142-1 according to an embodiment of the present disclosure may be the power consumed by the Scaler IC 142. Meanwhile, the DDR Core PW 142-2 may be the power consumed by a double data rate dynamic random access memory (DDR DRAM) operated together with the Scaler IC 142.

The external input port 120 according to an embodiment of the present disclosure is shown as being implemented as at least one of the USB or a thunderbolt (TBT).

The PDIC 141 according to an embodiment of the present disclosure may supply up to 90% of the power capacity of the SMPS 110 to the display 130 and the external input port 120 when the Scaler Core PW 142-1 and the DDR Core PW 142-2 consume 10% of the power capacity of the SMPS 110.

The PDIC 141 according to an embodiment may identify the power consumed by the display 130, and supply the external input port 120 with the power obtained by excluding the power consumption of the display 130 and the predetermined idle power from the power corresponding to 90% of the power capacity of the SMPS 110.

Figure 7:
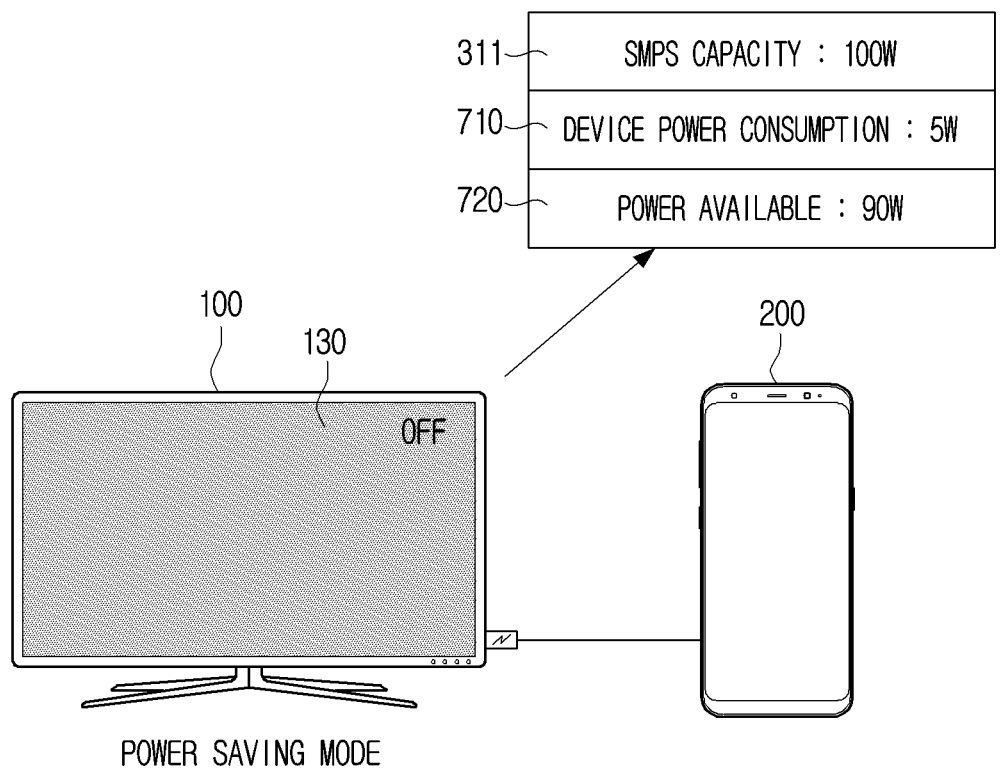
FIG. 7 is a diagram illustrating an example operation of the display device in a power saving mode according to various embodiments.

FIG. 7 is a diagram illustrating example operation of the display device in the power saving mode according to various embodiments.

The display device 100 according to an embodiment of the present disclosure may be operated in the power saving mode. The power saving mode according to an embodiment may be a mode in a state where no image signal is input to the display device 100.

The display device 100 may be operated in the power saving mode by determining whether to be operated in the power saving mode by the processor 140, and may also be operated in the power saving mode by a user operation.

The display 130 may be turned off when the display device 100 is in the power saving mode, and the power consumed by the display 130 may thus become zero (0) W.

In this case, the display device 100 may consume only the standby power required to operate the device in the normal mode when the image signal is input.

Accordingly, power 710 consumed by the display device 100 operated in the power saving mode may be the standby power, and for example, the standby power may be 5 W.

The processor 140 may supply the external device 200 with 90 W which is the power 720 obtained by excluding the device power consumption 710 and the predetermined idle power 5 W from 100 W which is the power capacity 311 of the SMPS 110, through the external input port 120.

Figure 8:
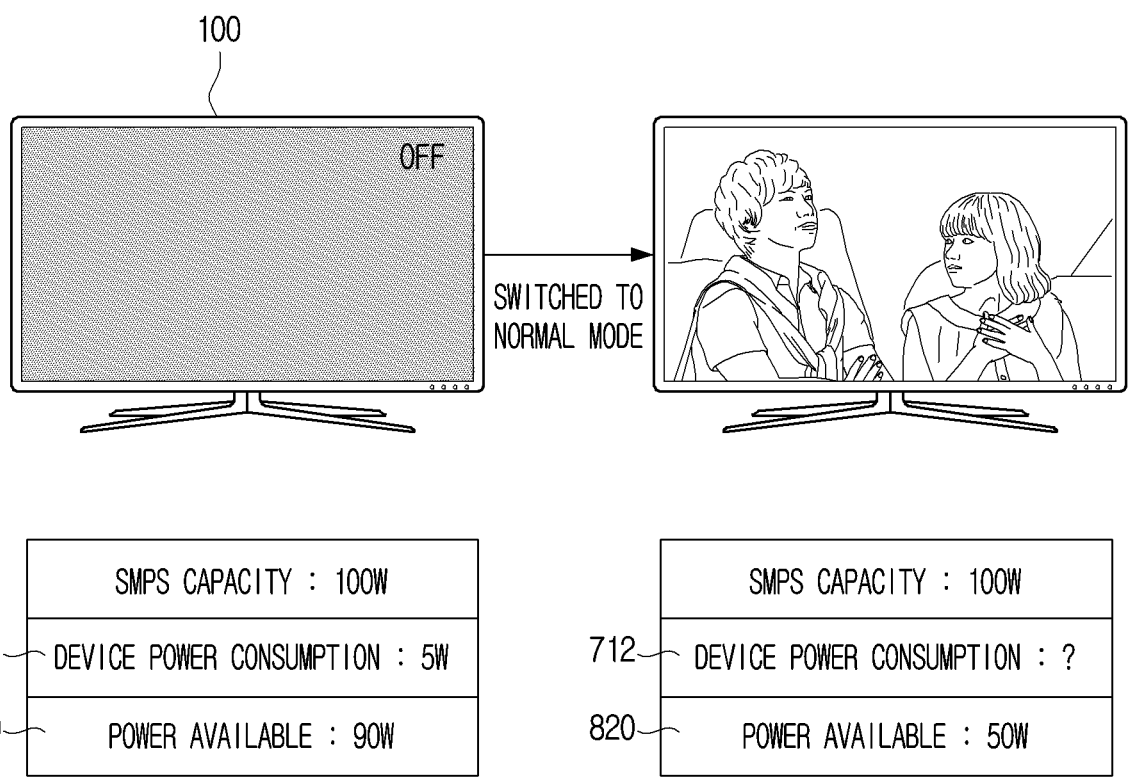
FIG. 8 is a diagram illustrating an example operation of the display device when switched to a normal mode according to various embodiments.

FIG. 8 is a diagram illustrating example operation of the display device when switched to the normal mode according to various embodiments.

The operation of the display device 100 according to an embodiment of the present disclosure may be switched from the power saving mode to the normal mode.

When being operated in the power saving mode, for example, the display device 100 may consume the standby power 711 of 5 W and supply 810 of 90 W to the external input port 120. The display device 100 may be operated in the normal mode when a predetermined condition is satisfied. The predetermined condition may include at least one of the user operation and the image signal input.

In this case, the processor 140 is unable to predict how much power the display 130 and the processor 140 are about to consume when the display device 100 is switched to the normal mode. An overload may be applied to the SMPS 110 of the display device 100 switched to the normal mode, which may cause a problem in the operation of the device when the power supplied to the external input port 120 is maintained the same without considering the power expected to be consumed by the display device 100 in the normal mode.

Therefore, the processor 140 according to an embodiment of the present disclosure may adjust the power supplied to the external input port 120 to be predetermined threshold power 820 of 50 W when the predetermined condition for the display device 100 to be switched to the normal mode is satisfied.

As a result, the device may be normally operated because the sum of the device power consumption 712 and the power available 820 for the external input port does not exceed the capacity of the SMPS even when the display device 100 switched to the normal mode displays the image corresponding to the normal mode.

Figure 9:
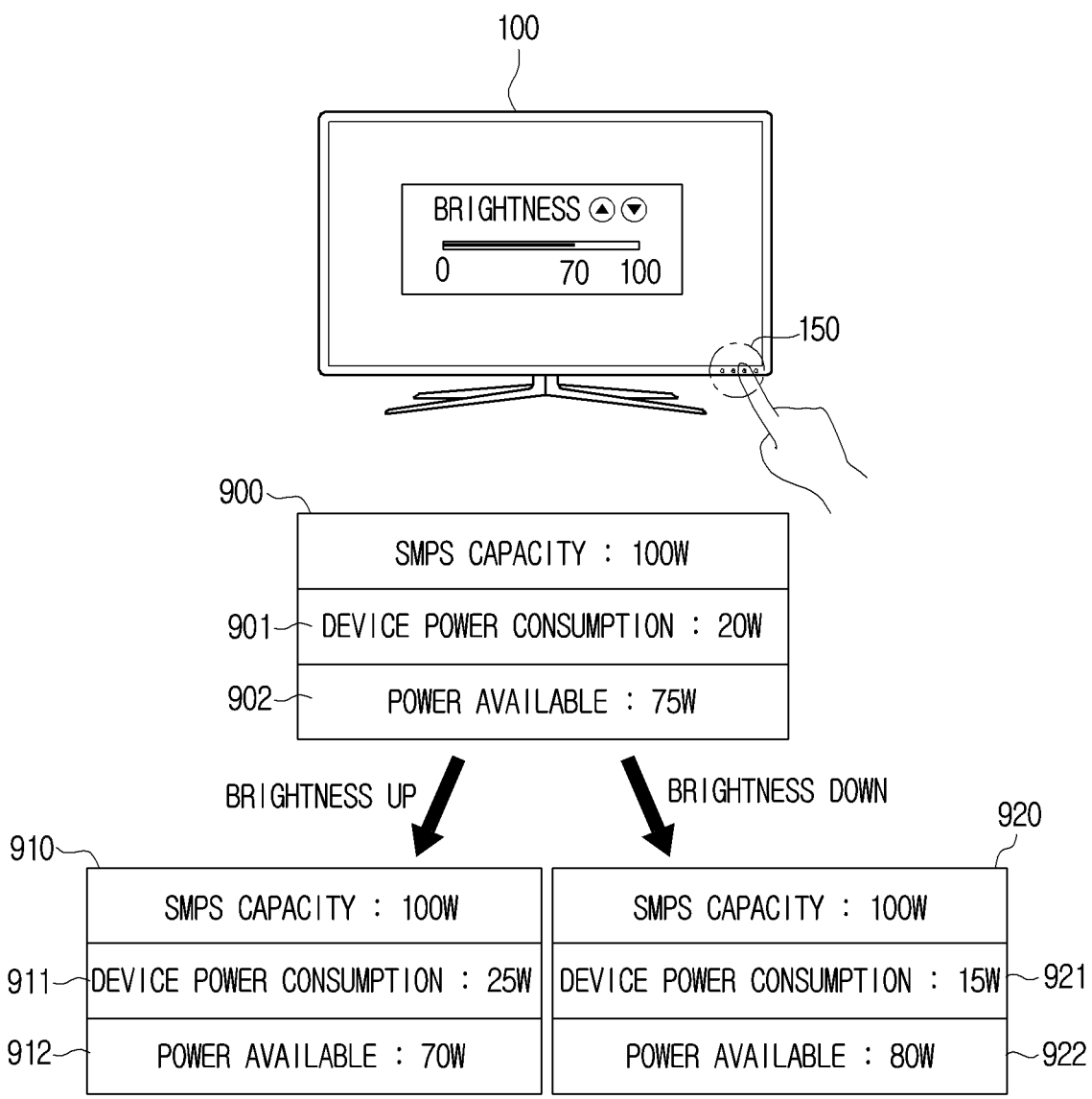
FIG. 9 is a diagram illustrating an example operation of the display device based on brightness adjustment according to various embodiments.

FIG. 9 is a diagram illustrating example operation of the display device based on brightness adjustment according to various embodiments.

A display device 100 according to an embodiment of the present disclosure may include the input unit 150. For example, the input unit 150 may be implemented as a button.

When the user command for adjusting the brightness of the display 130 is input through the input unit 150, the processor 140 according to an embodiment of the present disclosure may acquire the brightness information of the display 130. The display device 100, as shown in 900, may consume 901 of 20 W before the user operation, and supply 902 of 75 W to the external input port 20.

When a user operation 910 for brightness UP is input, the processor 140 according to an embodiment may acquire the brightness information of the display 130 to identify the device power consumption 911 of 25 W, and adjust the power available 912 for the external input port 120 to 70 W.

On the other hand, when a user operation 920 for brightness DOWN is input, the processor 140 may acquire the brightness information of the display 130 to identify device power consumption 921 of 15 W, and adjust the power available 922 for the external input port 120 to 80 W.

The display device 100 according to an embodiment of the present disclosure may flexibly adjust the power supplied to the external input port 120 in response to the user operation for brightness while the device is operated in the normal mode.

Figure 10:
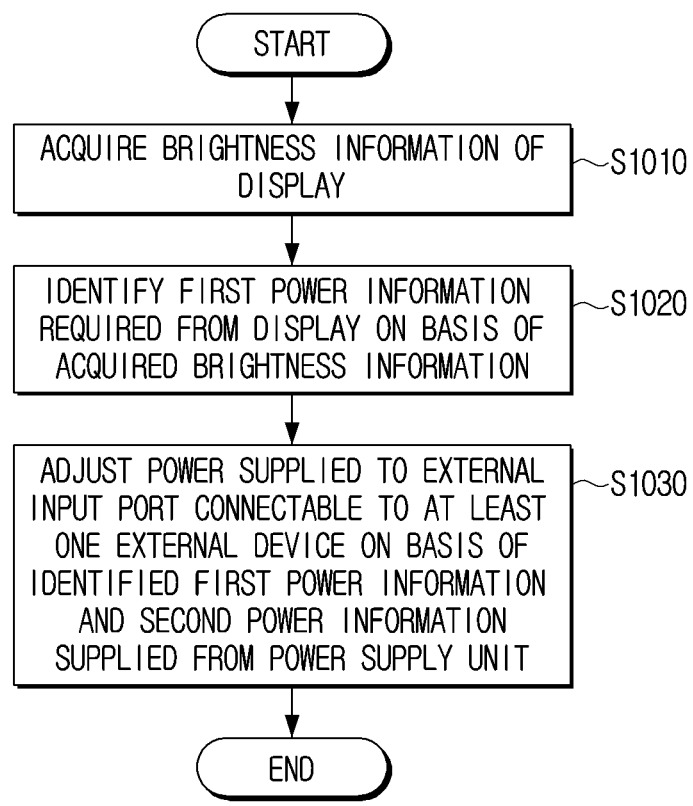
FIG. 10 is a flowchart illustrating an example method according to various embodiments.

FIG. 10 is a flowchart illustrating an example control method according to various embodiments.

The control method for a display device according to an embodiment of the present disclosure may include acquiring brightness information of a display (S1010).

The method may include identifying first power information required from the display on the basis of the acquired brightness information (S1020).

The method may include adjusting power supplied to an external input port connectable to at least one external device on the basis of the identified first power information and second power information supplied from a power supply unit (S1030).

The adjusting of the power supplied to the external input port (S1030) may include: receiving third power information required from the external device connected to the external input port; and adjusting the power supplied to the external input port on the basis of the received third power information, first power information, and second power information.

The adjusting of the power supplied to the external input port (S1030) may include: identifying information on the power available for the external input port on the basis of the first power information and the second power information; and adjusting the power supplied to the external input port on the basis of the identified power information and the received third power information.

The third power information may include information on voltage and current values, required for charging the external device, and in the adjusting of the power supplied to the external input port (S1030), the power may be supplied to the external input port at the voltage and current values included in the third power information when the power required from the external device that is calculated on the basis of the voltage and current values does not exceed the power available.

The adjusting of the power supplied to the external input port (S1030) may further include: supplying the power to the external input port at predetermined voltage and current values within a range that the values do not exceed the power available when the power required from the external device that is calculated on the basis of the voltage and current values exceeds the power available.

In the receiving of the third power information, the third power information required from the external device may be received using a USB power delivery (USB-PD) method or a power data objects (PDO) method.

In the adjusting of the power supplied to the external input port (S1030), the power supplied to the external input port may be adjusted on the basis of fourth power information and the second power information, required from the display, when the display device is in a power saving mode, and the fourth power information may be default power information corresponding to the power saving mode.

The method may further include: adjusting the power supplied to the external input port to threshold power when the display device is switched from the power saving mode to the normal mode; displaying an image corresponding to a normal mode; acquiring brightness information of the display; and re-identifying the first power information required from the display on the basis of the acquired brightness information.

In the acquiring of the brightness information of the display (S1010), the brightness information of the display may be acquired when a user command for adjusting the brightness of the display is input.

The external input port may have a USB type-C standard.

The various embodiments described above may be implemented in a computer or a computer-readable recording medium using software, hardware, or a combination of software and hardware. In some cases, the embodiments described in the disclosure may be implemented by the processor 130 itself. According to a software implementation, the embodiments such as the procedures and functions described in the present disclosure may be implemented by separate software modules. Each of the software modules may perform one or more functions and operations described in the disclosure.

Computer instructions for performing processing operations of the display device 100 according to the various embodiments of the present disclosure described above may be stored in a non-transitory computer-readable medium. The computer instructions stored in the non-transitory computer-readable medium may allow a specific device to perform the processing operations of the display device 100 according to the various embodiments described above when the computer instructions are executed by a processor of the specific device.

The non-transitory computer-readable medium indicates a medium that semi-permanently stores data therein and is readable by the machine. A specific example of the non-transitory computer-readable medium may include a compact disk (CD), a digital versatile disk (DVD), a hard disk, a Blu-ray disk, a universal serial bus (USB), a memory card, a read-only memory (ROM), or the like.

Although various example embodiments of the present disclosure have been shown and described hereinabove, the present disclosure is not limited to the above-mentioned specific embodiments, and may be variously modified by those skilled in the art to which the present disclosure pertains without departing from the gist of the present disclosure including as disclosed in the accompanying claims. These modifications should also be understood to fall within the scope and spirit of the present disclosure.

What is claimed is:

1. A display device comprising:
a power supply configured to supply power;
an external input port;
a display; and
at least one processor configured to:
   acquire brightness information of the display,
   identify first power information required from the display based on the acquired brightness information,
   receive third power information from an external device connected to the external input port, wherein the third power information includes information on voltage and current values required for charging the external device, and
   adjust power supplied to the external input port based on the first power information, second power information supplied from the power supply, and the third power information,
wherein at least one processor is configured to:
   based on power required from the external device that is calculated based on the voltage and current values not exceeding power available, control supply of power to the external input port at the voltage and current values included in the third power information, and based on the power required from the external device exceeding the power available, control supply of power to the external input port at specified voltage and current values within a range of values that does not exceed the power available, and wherein at least one processor of the device is configured to:

based on the display device being in a power saving mode, adjust the power supplied to the external input port based on default power information corresponding to the power saving mode of the display device and the second power information, adjust the power supplied to the external input port to a threshold power based on the display device switching from the power saving mode to a normal mode, and control the display to display an image corresponding to the normal mode.

2. The device of claim 1, wherein at least one processor is configured to:

identify information on power available for the external input port based on the first power information and the second power information, and adjust the power supplied to the external input port based on the identified power information and the third power information.

3. The device of claim 1, wherein at least one processor is configured to receive the third power information using universal serial bus-power delivery (USB-PD) or power data objects (PDO).

4. The device of claim 1, wherein at least one processor is configured to:

acquire the brightness information of the display, and re-identify the first power information required from the display based on the acquired brightness information.

5. The device of claim 1, further comprising an input unit comprising input circuitry, wherein at least one processor is configured to acquire the brightness information of the display based on a command for adjusting brightness of the display being input through the input unit.

6. The device of claim 1, wherein the external input port includes a USB type-C port.

7. A method of controlling a display device, the method comprising:

acquiring brightness information of a display of the display device;

identifying first power information required from the display based on the acquired brightness information;

receiving third power information from an external device connected to an external input port of the display device, wherein the third power information includes information on voltage and current values required for charging the external device, and adjusting power supplied to the external input port based on the first power information, second power information supplied from a power supply of the display device, and the third power information, wherein, in the adjusting of the power supplied to the external input port, power is supplied to the external input port at the voltage and current values included in the third power information based on power required from the external device that is calculated based on the voltage and current values not exceeding the power available, wherein, in the adjusting of the power supplied to the external input port, power is supplied to the external input port at specified voltage and current values within a range of values that do not exceed the power available based on the power required from the external device that is calculated based on the voltage and current values exceeding the power available, and wherein the method further comprises:

based on the display device being in a power saving mode, adjusting power supplied to the external input port based on default power information corresponding to the power saving mode of the display device and the second power information, adjusting the power supplied to the external input port to a threshold power based on the display device switching from the power saving mode to a normal mode, and controlling the display to display an image corresponding to the normal mode.

8. The method of claim 7, wherein the adjusting of the power supplied to the external input port includes:

identifying information on power available for the external input port based on the first power information and the second power information; and adjusting the power supplied to the external input port based on the identified power information and the received third power information.

9. The method of claim 7, wherein the third power information is received using universal serial bus-power delivery (USB-PD) or power data objects (PDO).

10. The method of claim 7, further comprising:

acquiring the brightness information of the display, and re-identifying the first power information required from the display based on the acquired brightness information.

11. The method of claim 7, wherein the acquiring the brightness information of the display includes acquiring the brightness information of the display based on a user command for adjusting brightness of the display.

12. The method of claim 7, wherein the external input port includes a USB type-C port.

* * * * *